No. 863,980. PATENTED AUG. 20, 1907.
H. J. GERNER.
CONTINUOUS ICE CREAM FREEZER.
APPLICATION FILED NOV. 12, 1906.
4 SHEETS—SHEET 1.
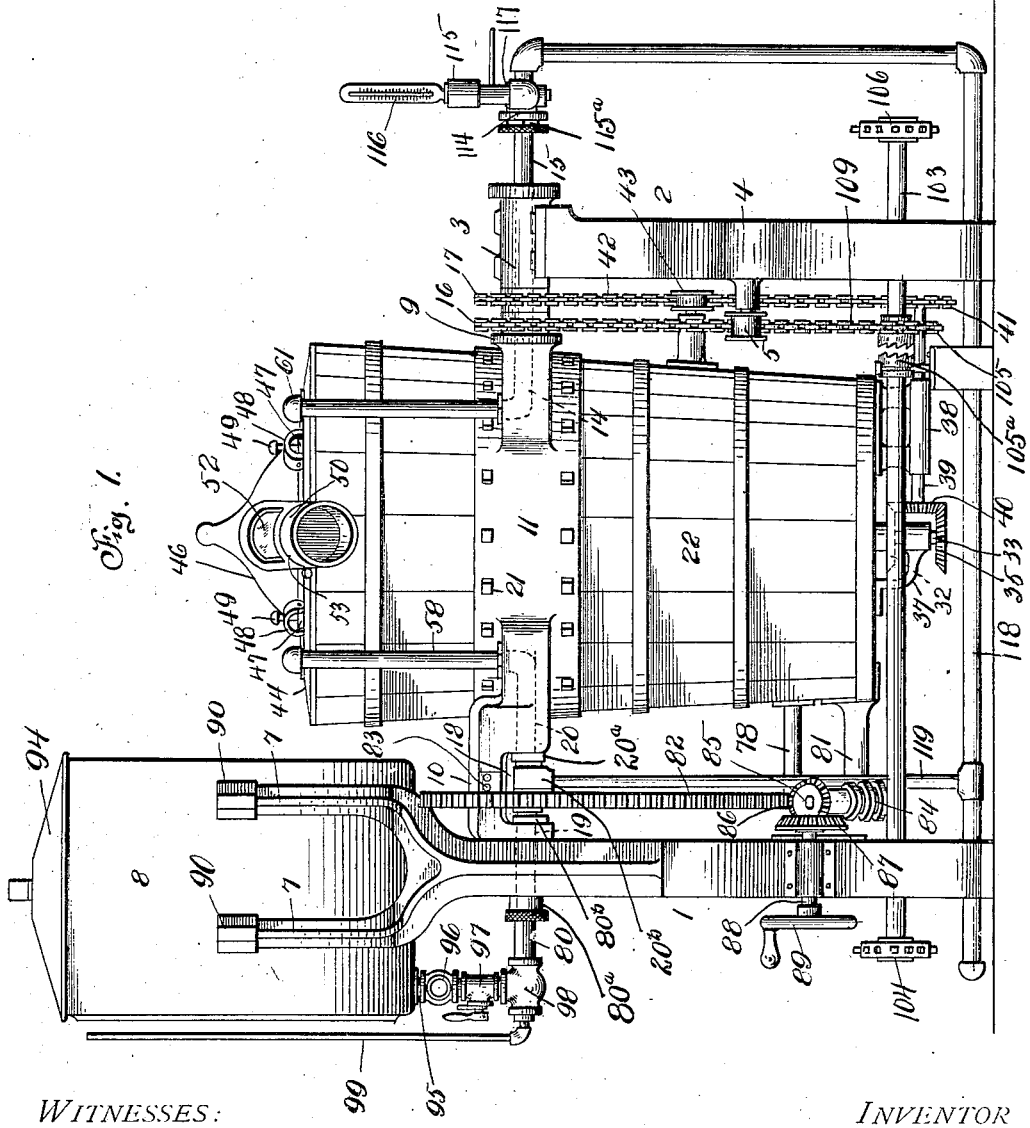
WITNESSES:
INVENTOR
H. J. Gerner,
BY
Attorneys

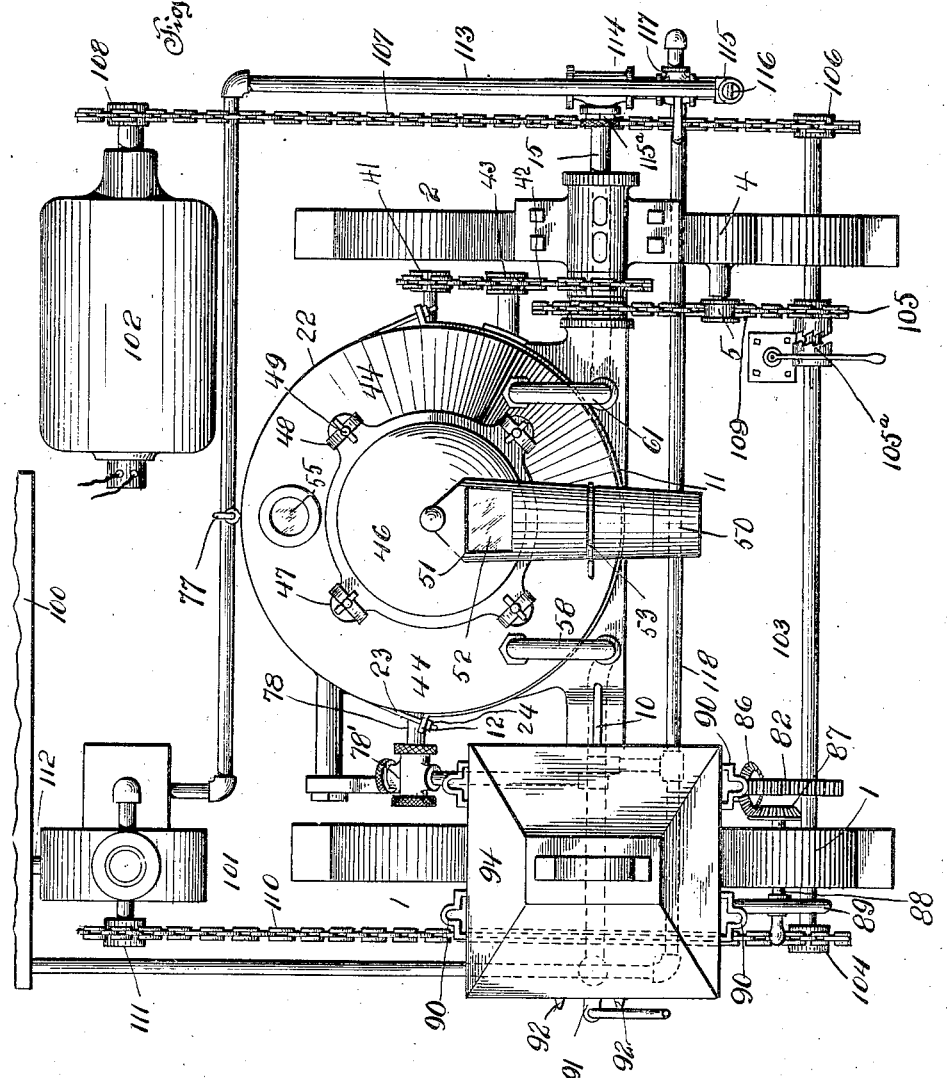

No. 863,980.  
PATENTED AUG. 20, 1907.
H. J. GERNER.  
CONTINUOUS ICE CREAM FREEZER.  
APPLICATION FILED NOV. 12, 1906.
4 SHEETS—SHEET 3.
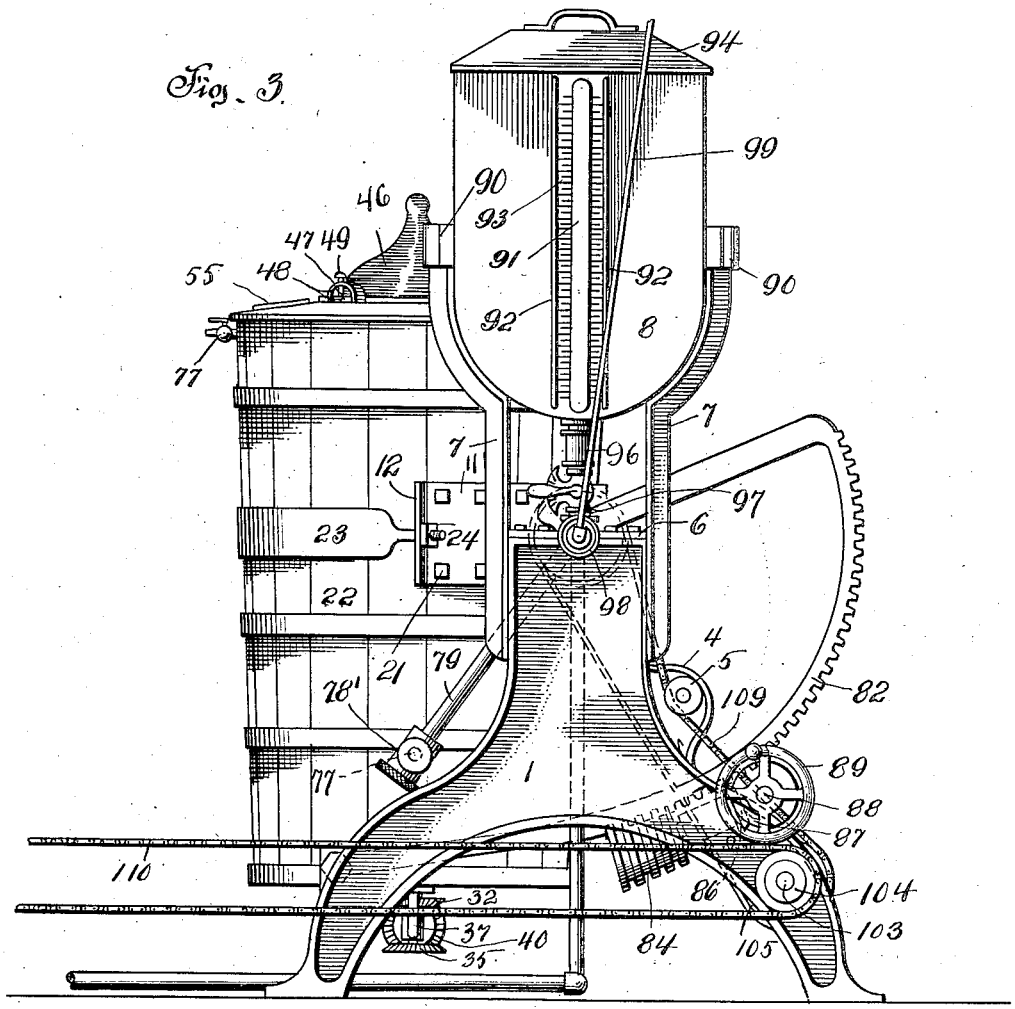
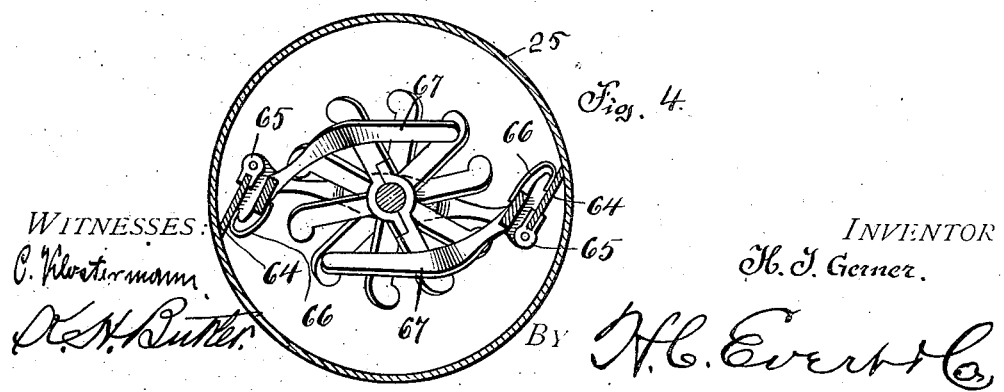
WITNESSES  
INVENTOR  
H. J. Gerner.  
BY  
Attorneys

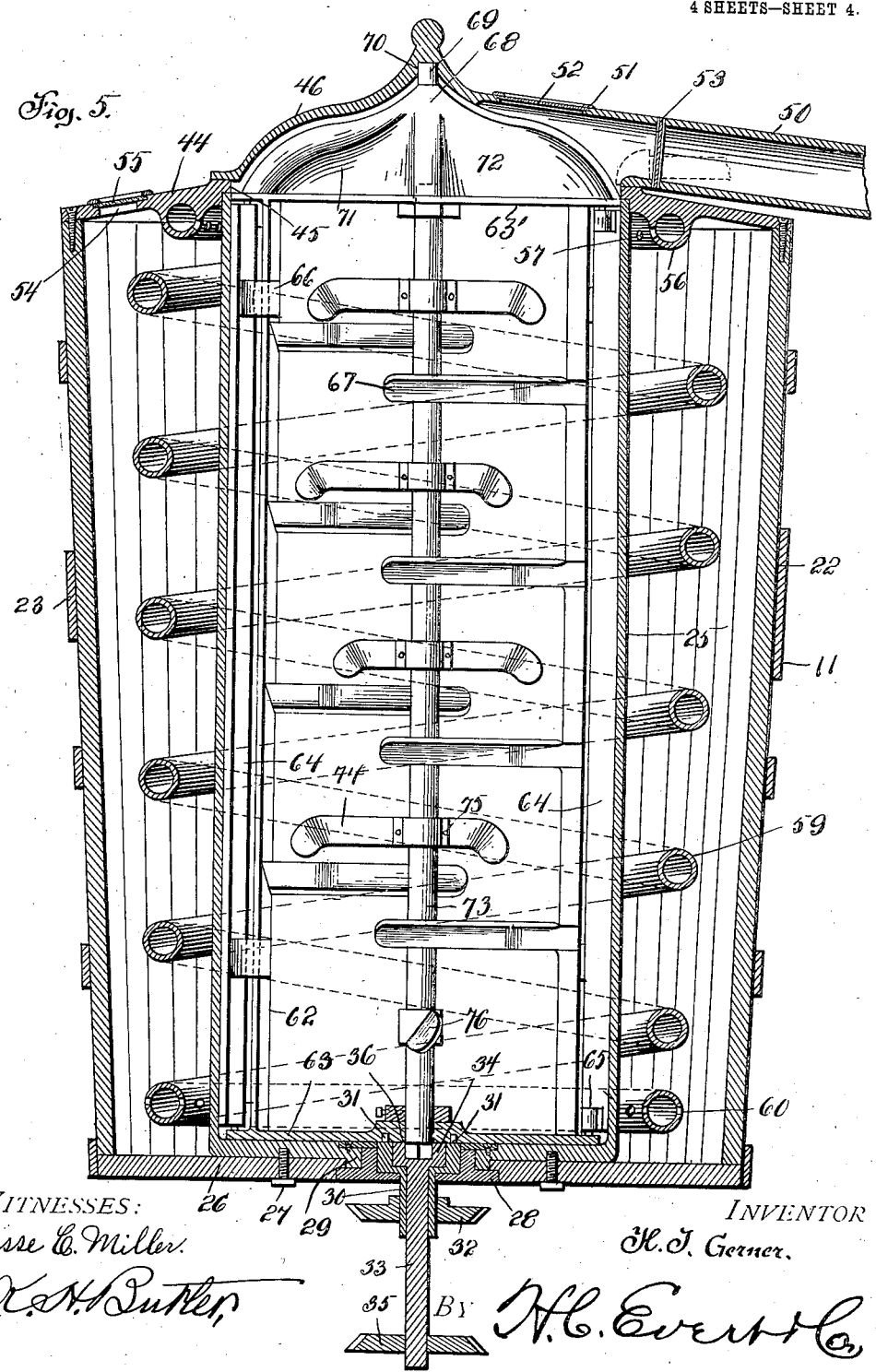

UNITED STATES PATENT OFFICE.

HENRY J. GERNER, OF CANTON, OHIO, ASSIGNOR TO MARY GERNER, OF CANTON, OHIO.

CONTINUOUS ICE-CREAM FREEZER.

No. 863,980.      Specification of Letters Patent.      Patented Aug. 20, 1907.

Application filed November 12, 1906. Serial No. 343,012.

*To all whom it may concern:*

Be it known that I, HENRY J. GERNER, a citizen of the United States of America, residing at Canton, in the county of Stark and State of Ohio, have invented certain new and useful Improvements in Continuous Ice-Cream Freezers, of which the following is a specification, reference being had therein to the accompanying drawing.

This invention relates to ice cream freezers and machines of that type that may be styled a continuous ice cream freezer or machine.

The primary object of this invention is the provision of novel means for continuously and simultaneously agitating and subjecting cream to a frigid temperature, whereby cream can be frozen continuously during the operation of the freezer or machine.

The invention in its broadest aspect involves a novel form of tilting gravity feed freezer having a circulating refrigeratory agent, and novel means for agitating and delivering frozen cream or a similar substance from the freezer. To this end, I have devised a freezer or machine embodying a plurality of structural elements, which when combined produce a durable and inexpensive machine. The principal elements of the invention namely a frame and trunnions, a tub, can and dasher, a cream reservoir, together with a circulating refrigeratory agent, will be hereinafter separately and specifically described in detail, together with the novel arrangement and objects accomplished from such a combination of elements.

The preferred embodiments of my invention are illustrated in the drawings accompanying this specification, but I desire it to be understood that the same are susceptible to various changes without departing from the scope of the invention.

In the drawing, Figure 1 is a front elevation of the freezer or machine, Fig. 2 is a plan of the same, Fig. 3 is an end elevation, Fig. 4 is a horizontal sectional view of a can and dasher used in connection with the freezer, and Fig. 5 is a vertical sectional view of the freezer tub and can, illustrating the dasher thereof in elevation.

*The frame and trunnions.*—The frame comprises two flanged uprights or stands 1 and 2, the stand 2 supporting a bearing 3, and having an enlargement 4 formed upon its front edge to support an idle pulley 5. The upright or stand 1 is provided with a bearing 6 and with two upwardly extending bifurcated curved arms 7, said arms being T-shaped in cross section and forming a saddle for a reservoir 8. In the bearings 3 and 6 are journaled alining tangentially disposed hollow tub supporting trunnions 9 and 10, said trunnions being formed integral or coalesced by a semi-circular band 11 having pierced flanged ends 12. The trunnion 9 is formed with an angular passage 14, which receives the end of a pipe 15 extending through the bearing 3 and into the trunnion. Upon the trunnion 9 are journaled two connected sprocket wheels 16 and 17. The trunnion 10 is recessed, as at 18 and provided with alining passages 19 and 20.

*The tub, can and dasher.*—The upper and lower edges of the band 11 are pierced to receive screw bolts 21 employed in securing a tub 22 to said band, the tub being further held by a strap 23 having its ends fastened to the pierced flanged ends 12 of the band 11 by nuts 24. In the tub 22 is mounted a can 25, said can being secured to the bottom 26 of the tub by screw bolts 27. The bottom 26 of the tub 22 is cut away to accommodate a central bearing block 28 and resting upon said bearing block is the depending circular flange 29 of the can 25. In the bearing block 28 is journaled a sleeve 30 carrying two upwardly extending diametrically opposed pins 31, and a beveled gear wheel 32. Revolubly mounted in the sleeve 30 is a shaft 33 having a head 34 at its one end and a beveled gear wheel 35 at its opposite end. The head 34 is provided with a rectangular recess or socket 36, the object of which will be hereinafter more fully described.

The bottom 26 of the tub 22 is provided with two brackets 37 and 38, the bracket 37 bracing the lower end of the shaft 33, while in the bracket 38 is journaled a shaft 39 having a gear wheel 40 adapted to mesh with the gear wheels 32 and 35. Upon the opposite end of the shaft 39 is mounted a sprocket wheel 41 and over said wheel and the wheel 17 of the trunnion 9 travels a sprocket chain 42. Engaging the chain 42 is an idle pulley 43 carried by the side of the tub 22.

Suitably secured to the upper edges of the tub 22 and the can 25 is a cover plate 44 said plate being preferably soldered to the upper edges of the can 25. The cover plate 44 is provided with a central opening 45 and fitting over said opening is a substantially cone-shaped lid 46, said lid having radially disposed lugs 47, by which the lid is secured to the cover plate 44. Pivoted yokes or straps 48 having set screws 49 are adapted to engage the lugs 47 and firmly retain the lid 46 upon the cover plate 44. The lid 46 is provided with a spout 50 adapted to extend over the edge of the tub 22. The spout 50 is provided with a sight opening 51 covered by a piece of transparent material 52, and with a pivoted gate 53.

The cover plate 44 at its rear edge is provided with a sight opening 54 covered by a piece of transparent material 55. The cover plate adjacent to the edges of the opening 45 is formed with a tubular enlargement 56 having circumferentially arranged openings 57 formed therein. Communicating with the tubular enlargement 56 near the front edge of the cover plate 44 is a pipe 58, said pipe extending downwardly in front of the tub 22 and connecting with the passage 20 of the trunnion 10.

In the tub 22 is arranged a coil of tubing 59, said coil surrounding the can 25 and having its lowermost convolution provided with a plurality of openings 60. The upper end of the coil of tubing connects with a pipe 61, which extends downwardly in front of the tub 22, and connects with the passage 14 of the trunnion 9.

In the can 25 is mounted for rotation, a dasher or agitator comprising a frame, which embodies uprights or bars 62, and base 63, and a top connecting bar 63′; the uprights or bars 62 are set in from the edge of the base 63 and from the ends of the top cross bar 63′, and the base 63 of said frame is provided in its underneath face with recesses positioned so as to receive the pins 31 carried by the sleeve 30. Scrapers 64 are pivoted at their ends in sockets 65 carried by the base, and by the extending ends of the top cross bar 63′, the said scrapers being therefore mounted between the uprights or bars 62 and the can 25. These scrapers 64 are normally held in engagement with the inner face of the can by springs 66 secured to the said scrapers and to the uprights or bars 62. The uprights or bars 62 of the frame are provided with inwardly extending parallel arms 67, these arms being slightly curved and beveled towards the center of the frame. The top of the frame is provided with a deflector plate 68, having a stud 69 loosely mounted in a socket 70 formed in the lid 46 of the tub. The said deflector plate 68 is formed with convex surfaces 71 and concave surfaces 72, the opposite side of the concave surface being convex, and the opposite side of the convex surface being concave.

Between the deflector plate 68 and the base 63 of the frame is journaled a vertical shaft 73 which has a rectangular lower end fitting in the rectangular recess or socket 36 of the head 34: This shaft 73 extends upward between the parallel arms 67 carried by the uprights or bars 62 of the frame, and is provided with a plurality of radially disposed agitator arms 74, arranged in sets of two, that is, two arms projecting from the shaft at substantially equi-distant points throughout its length, these arms being suitably clamped to the shaft as indicated at 75, and each arm being curved and beveled as at 76. The particular curvature or shape imparted to the said agitator arms carried by the shaft 73 and the beater arms 67, is such that the tendency of these arms is to force the partially frozen substance towards the outlet end of the can.

The tub 22 at its upper rear edge is provided with an air vent cock 77, and adjacent to its bottom edge at one side of the tub with a cream inlet pipe 78, said pipe extending through the tub into the can 25. That portion of the pipe 78 passing through the brine compartment or space between the tub and can, can be suitably protected to prevent the cream from freezing as it passes into the can. The pipe 78 is connected by a four-way coupling 78′ to a pipe 79, said pipe extending upwardly and having a connection 80ᵇ extending through the passage 19 of the trunnion 10, into the stuffing box 80ᵃ, where it communicates with the pipe 80. The four-way coupling 78′ is provided whereby the pipes 78 and 79 can be easily cleaned.

The lower edge of the tub 22 confronting the upright or stand 1 is provided with an outwardly extending arm 81 connecting with a segment rack 82 secured to the trunnion 10 as at 83. Meshing with the segment rack 82 is a worm 84 carried by the lower end of a shaft 85 journaled at one side of the upright or stand 1. The shaft 85 carries a beveled gear wheel 86 meshing with a similar wheel 87, carried by a shaft 88 journaled upon the front edge of the upright or stand 1, said shaft 88 being provided with a wheel 89 whereby a rotary motion may be imparted to the worm 84.

The mechanism just described, including the rack 82, worm 84, etc., constitutes the means employed for tilting the tub 22.

*Reservoir.*—The reservoir 8 is supported in the saddle formed by the arms 7, the sides of said reservoir being provided with T-shaped sockets 90 to receive the bifurcated ends of the arms 7. The reservoir is provided with a transparent covered sight opening 91 protected by vertically disposed ribs 92. The edges of the sight opening 91 are graduated as at 93, whereby the quantity of the contents within the reservoir can be easily determined. A lid 94, having a suitable handle fits upon the top of the reservoir. The bottom of the reservoir is provided with an outlet pipe 95 having a float valve 96 and a regulating valve 97, these valves being of a conventional form and connecting with the pipe 80 by a T 98. The T is provided with an upwardly extending air vent pipe 99. The pipe 80 extends into a conventional form of stuffing box 80ᵃ carried by the bearing 6 of the upright or stand 1, and into the stuffing box extends the connection 80ᵇ of the pipe 79, said connection extending through the passage 19 of the trunnion 10. In this manner the pipe 79 and its connection can be moved when tilting the tub 22 without causing a leakage, and at the same time permitting of the cream flowing into the tub while the same is being moved or tilted.

*Refrigerator circulating agent.*—In connection with the freezer tub 22, I use brine as a freezing agent, the brine being contained in a tank 100 located in close proximity to the tub 22. In connection with the tank, I employ a conventional form of pump 101 and motor 102, the motor driving the dasher within the tub 22 and the pump 101. This is accomplished by journaling a shaft 103 in the uprights or stands 1 and 2, said shaft being provided with sprocket wheels 104, 105, and 106. The shaft 103 is driven by a sprocket chain 107 passing over sprocket wheel 108 carried by the armature shaft of the motor 102 and the sprocket wheel 106. The dasher within the tub 22 is driven through the medium of the sprocket chain 42 heretofore mentioned, and by a sprocket chain 109 passing over the sprocket wheels 16 and 105, said chain being guided by the idle pulley 5 of the upright or stand 2. In connection with the sprocket wheel 105 I use a conventional form of clutch 105ᵃ which may be suitably controlled whereby should I desire to operate the pump 101 independently of the freezer, I accomplish the same by throwing the clutch out of engagement with the sprocket wheel 105, it of course being understood that the sprocket wheel is loosely mounted upon the shaft 103 while the clutch member is slidably keyed thereto. The pump 101 is driven by a sprocket chain 110 passing over the sprocket wheel 111 of the pump and the sprocket wheel 104 of the shaft 103.

The pump 101 connects with the brine tank 100 by a pipe 112 and is then connected to the pipe 15 by a pipe 113, connection 115 and T 114. The T 114 is provided with a conventional form of stuffing box having a gland 115ᵃ whereby the pipe 15 can move freely within the T, thus providing a non-leakable connection whereby the tub 22 can be tilted. The connection 115 is provided with a conventional form of thermometer 116 to determine the temperature of the brine solution passing through said connection. Interposed between the T 114 and the connection 115 is a valve 117 to regulate the flow of brine through the coil of tubing 59 contained within the tub 22. The valve 117 is provided with a return pipe 118, and connecting with said pipe is a pipe 119 which extends upwardly into the recess 18 of the trunnion 10 and connects with the passage 20 thereof. The passage 20 is provided with a conventional form of stuffing box 20$^a$ in which the connection 20$^b$ is journaled, whereby the tub 22 can be tilted without interfering with the stationary pipe 119.
The circulation of brine through my improved freezer or machine is as follows:—As the brine is forced through the pipes 113 and 15, trunnion 9 and pipe 61 to the coil of tubing 59, the brine is equally distributed in the bottom of the tub 22. The brine then passes upwardly in the tub into the tubular perforated enlargement 56 of the cover plate 44 from where it passes through pipe 58, trunnion 10 and pipe 19 to the return pipe 118. In this manner, I maintain a thorough circulation of brine within the tub 22, and by carrying the brine to the lower part of the tub then discharging the same to cool the sides of the can 25, I obtain a lower degree of temperature than if the brine was simply turned loose into the tub at the top thereof. In connection with the refrigeratory circulating agent, I do not care to confine myself to the type of location of the pump 101 as this pump may be connected directly to the shaft 103 while a coupling will be employed to connect the armature shaft 102 directly to the shaft 103, thus dispensing with the sprocket chains 107 and 110 at the sides of my improved freezer or machine. It is also obvious that another freezing agent can be used in lieu of the brine.

General operation: The freezing agent having been placed in proper circulation, cream is admitted to the can 25 from the reservoir 8, and as said cream enters the can it is thoroughly agitated and beaten by the parallel arms 67 and the agitator arms 74, these arms revolving in opposite directions to thoroughly stir the cream entering the can. The juxtaposition of the agitator arms 74 to the arms 67 when revolving insures a perfect whipping of the cream and a rapid freezing of the same. The curvature and inclination of the arms 67 and 74 causes the cream as it thickens and gradually becomes frozen to be elevated in the can 25, this elevation of the frozen cream being gradual and natural during the operation of my improved freezer or machine. As the frozen cream passes upwardly within the can 25 it is delivered through the spout 50 to a suitable receptacle or packing can placed beneath the spout 50. The freezing of the cream can be at any time observed through the sight opening 51 and the flow of frozen cream through the spout 50 retarded by the gate 53, while an empty receptacle is being exchanged for a full one beneath said spout.

An important feature of the present invention resides in the novel manner in which the tub 22 is trunnioned, I having found by actual experience where a tub is trunnioned at its sides centrally or in line with its axis, that it is impossible to tilt the tub and at the same time place a receptacle under the edge of the can. The tub is tilted by the mechanism previously described, namely rack 82, worm 84, beveled gear wheels 86 and 87, shaft 88 and wheel 89, when it is desired to cleanse the same, and in order that the contents of the can may be easily removed when the operation of the freezer has ceased, I arrange the trunnions 9 and 10 tangentially with relation to the tub this arrangement being necessary to elevate the entire tub above its trunnions.

Another important feature of my invention resides in the two-part dasher, namely the shaft 73 and the frame 62 together with the mechanism for driving the shaft and frame in opposite directions.

It is thought that the construction and operation of my improved freezer or machine will be readily understood from the foregoing description, and I desire it to be understood that such structural changes as are permissible by the appended claims, may be resorted to without departing from the spirit and scope of the invention.

What I claim and desire to secure by Letters Patent, is:—

1. In a freezer, the combination with stands, of a tub, alining hollow tub supporting trunnions mounted upon said stands and disposed tangentially to said tub, a stationary can mounted in said tub, a reservoir carried by one of said stands and having a pipe extending through one of said trunnions into said tub and can, a coil of tubing surrounding said can within said tub, a brine supply pipe passing through the other of said trunnions and connecting with said coil of tubing, another pipe connecting with said coil of tubing and passing through the other of said trunnions, means for agitating the contents of said can, and means for moving said tub and can from a vertical to a horizontal position, substantially as described.

2. In an ice-cream freezer, the combination with uprights or stands, of a tub, alining hollow trunnions supporting said tub upon said stands and disposed tangentially to said tub, a can mounted in said tub, a coil of tubing surrounding said can, a pipe extending through one of said trunnions and connecting with said coil of tubing, pipes extending through the other of said trunnions, one of said pipes communicating with said coil of tubing, the other of said pipes communicating with said can, a dasher within said can embodying two revoluble parts, means for revolving said parts in opposite directions, and means for moving said tub and can from a vertical to a horizontal position, substantially as described.

3. In an ice-cream freezer, the combination with stands or uprights, of a tub, hollow trunnions supporting said tub upon said stands, a can mounted in said tub, a coil of tubing surrounding said can, means for circulating refrigeratory agent through said trunnions and said coil of tubing, a cream reservoir carried by one of said stands and communicating with the can within said tub through one of said trunnions, a dasher within said can and embodying two oppositely revolving parts, means to revolve the parts of said dasher in opposite directions, and means for moving said tub and can from a vertical to a horizontal position.

4. In an ice-cream freezer, the combination with uprights or stands, of a tub, hollow trunnions supporting said tub upon said stands, a can mounted in said tub, a reservoir carried by one of said stands, a pipe connecting said reservoir with said can and extending through one of said trunnions, a dasher within said can and embodying two parts, parallel arms carried by one of said parts, agitating arms carried by the other of said parts, scrapers carried by one of said parts, means operable from one of said trunnions to revolve said parts in opposite directions, means to maintain a circulating refrigeratory agent within said tub, and means for moving said tub and can from a vertical to a horizontal position.

5. In an ice-cream freezer, a freezer tub, alining hollow trunnions supporting said tub and disposed tangentially thereto, a can mounted in said tub, a reservoir, a pipe in communication with said reservoir and said can, means for agitating cream within said can, said means embodying two oppositely revoluble parts, and means for moving said tub and freezer can from a vertical to a horizontal position.

6. In an ice-cream freezer, a freezer tub, alining trunnions supporting said tub and disposed tangentially thereto, a can mounted in said tub, a reservoir, a pipe connecting said reservoir with said can and extending through one of said trunnions, means to maintain a circulating refrigeratory agent within said tub, means for moving the tub and freezer can from a vertical to a horizontal position.

7. In an ice-cream freezer, a freezer tub hung to swing in uprights or stands on trunnions journaled on said uprights and secured to the tub tangentially to the axis thereof, a freezer can mounted in the tub, a reservoir supported on one of said uprights or stands, a pipe in communication with the reservoir and the freezer can, a dasher within said can and embodying two oppositely revolving parts, and means for moving said tub and freezer can from a vertical to a horizontal position.

8. In an ice cream freezer, a freezer can mounted stationary within a freezer tub, a cover resting upon the upper end of the tub and can respectively and closing the space between said can and tub, a hollow perforated enlargement carried by the underneath face of said cover and forming a freezing agent outlet from the tub, a return pipe connecting with said hollow enlargement, a freezing agent supply pipe extending into the tub through the cover and coiled around said can with its lowermost coil perforated to discharge the freezing agent around the lower end of the can, and a can-cover fitted on and secured to the first mentioned cover, having a discharge spout extending over the tub.

9. In an ice cream freezer, a freezer can stationary within a freezer tub, a cover resting on the upper end of the can and tub and closing the space between said can and tub, a reservoir, a liquid supply pipe communicating with the reservoir and with the can adjacent the bottom of the latter, a freezing agent supply pipe leading into the tub through said cover and coiled around said can and discharging at the lower end of the can, a return pipe also communicating with the tub through the cover thereof, and hollow trunnions supporting said tub and through which trunnions said freezing agent supply pipes and said freezing agent return pipes extend.

10. In an ice cream freezer, a freezer tub, a bearing block mounted in the bottom of said tub, a can mounted stationary on the bottom of the tub and having a depending annular flange resting on the bearing block, a sleeve journaled in said bearing block and having upwardly-projecting pins, a shaft mounted in said sleeve having a head provided with a socket, and a dasher comprising a frame having a base engaged by the pins of said sleeve, scrapers carried by said frame, inwardly-extending arms carried by the frame, a dasher shaft having its lower end received in said socket in the sleeve head, and agitator arms carried by said shaft.

11. In an ice-cream freezer, a freezer can stationary within a freezer tub, and a two part dasher, one part of said dasher comprising a frame embodying a base, a pair of uprights or bars, a deflector plate, beater arms carried by said uprights or bars, and pivotally mounted scraper bars carried by said frame, the other part of said dasher comprising a rotatable shaft, agitator arms carried thereby, the arms of the frame and said agitator arms being disposed to force the material to the outlet end of said can, and means for simultaneously rotating the frame and the dasher shaft in opposite directions.

12. In an ice cream freezer, the combination with a can, a dasher comprising a frame, rotatable in the can, scrapers pivoted at their ends to the frame, springs carried by the frame and bearing against the scrapers to normally hold the latter in engagement with the can, a deflector carried by the upper end of the frame, inwardly-extending arms carried by said frame, a dasher shaft journaled at its ends in the deflector plate and base of the frame and rotating in the opposite direction of rotation of the frame, and agitator arms carried by said frame.

13. In an ice-cream freezer, stands, trunnions journaled in said stands, a tub supported by said trunnions at one side of the axis of said tub, and a freezer can within said tub.

14. In an ice-cream freezer, stands, trunnions journaled in said stands, a tub supported by said trunnions at one side of the axis of said tub, a freezer can within said tub, and means for circulating a refrigeratory agent around said can.

15. In an ice-cream freezer, stands, trunnions journaled in said stands, a tub supported by said trunnions at one side of the axis of said tub, and means for circulating a refrigeratory agent within through said tub.

In testimony whereof I affix my signature in the presence of two witnesses.

HENRY J. GERNER.

Witnesses:
J. P. FAWCETT,
PETER J. COLLINS.